US011037300B2

(12) United States Patent
Davydov et al.

(10) Patent No.: US 11,037,300 B2
(45) Date of Patent: *Jun. 15, 2021

(54) MONITORING SYSTEM

(71) Applicant: Cherry Labs, Inc., Wilmington, DE (US)

(72) Inventors: Nikolay Davydov, Los Altos Hills, CA (US); Maxim Goncharov, Togliatti (RU); Stanislav Veretennikov, Saint-Petersburg (RU)

(73) Assignee: Cherry Labs, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/647,129

(22) Filed: Jul. 11, 2017

(65) Prior Publication Data
US 2018/0315200 A1 Nov. 1, 2018

Related U.S. Application Data

(60) Provisional application No. 62/491,832, filed on Apr. 28, 2017.

(51) Int. Cl.
G06K 9/00 (2006.01)
H04N 7/18 (2006.01)
(Continued)

(52) U.S. Cl.
CPC ............ G06T 7/20 (2013.01); G06K 9/00348 (2013.01); G06K 9/00771 (2013.01); G08B 13/196 (2013.01); G10L 15/08 (2013.01); G10L 15/26 (2013.01); G10L 25/27 (2013.01); G10L 25/48 (2013.01); H04N 7/18 (2013.01); H04N 7/181 (2013.01); G06K 9/00281 (2013.01); G06K 9/00355 (2013.01); G06K 9/00369 (2013.01);
(Continued)

(58) Field of Classification Search
CPC ................................ G06T 7/20; G08B 13/196
USPC .......................................................... 348/154
See application file for complete search history.

(56) References Cited

U.S. PATENT DOCUMENTS 7,940,302 B2  5/2011 Mehrotra et al.
8,373,753 B2  2/2013 Cheng et al.
(Continued)

FOREIGN PATENT DOCUMENTS

CN    201298284 Y    8/2009
CN    105282490 A    1/2016

OTHER PUBLICATIONS

Serena Yeung, et al. "Learning of Action Detection from Frame Glimpses in Videos", arXiv:1511.06984, 2015.

Primary Examiner — Amir Shahnami

(57) ABSTRACT

A monitoring system includes sensors that monitor activity within a designated territory. The sensors including visual sensors that make video recordings. A local processing system located within or proximate to the designated territory receives signals from the sensors. The local processing system processes and analyzes the signals from the sensors to produce messages that describe activity within the designated territory as monitored by the sensors. The messages do not include audio, visual or other direct identifying information that directly reveal identity of persons within the designated territory. A monitoring station outside the designated territory receives the messages produced by the local processing system and makes the messages available to external observers.

28 Claims, 9 Drawing Sheets

(51) Int. Cl.
  *G06T 7/20* (2017.01)
  *G08B 13/196* (2006.01)
  *G10L 15/08* (2006.01)
  *G10L 25/48* (2013.01)
  *G10L 25/27* (2013.01)
  *G10L 15/26* (2006.01)

(52) U.S. Cl.
  CPC .............. *G06T 2207/10016* (2013.01); *G06T 2207/10024* (2013.01); *G06T 2207/20084* (2013.01); *G06T 2207/30232* (2013.01)

(56) References Cited

U.S. PATENT DOCUMENTS

| | | | |
|---|---|---|---|
| 8,516,514 | B2 | 8/2013 | Belz et al. |
| 8,976,237 | B2 | 3/2015 | Cheng et al. |
| 9,293,016 | B2 | 3/2016 | Friedman |
| 9,432,632 | B2 | 8/2016 | Cheng et al. |
| 9,536,310 | B1 * | 1/2017 | Kusens ................ G08B 21/043 |
| 9,626,496 | B2 | 4/2017 | Friedman |
| 2006/0064384 | A1 * | 3/2006 | Mehrotra ............. G01S 3/7864 |
| | | | 705/57 |
| 2008/0198159 | A1 | 8/2008 | Liu et al. |
| 2011/0228094 | A1 * | 9/2011 | Cheng ................ G06K 9/00771 |
| | | | 348/159 |
| 2013/0150686 | A1 | 6/2013 | Fronterhouse et al. |
| 2013/0230211 | A1 * | 9/2013 | Tanabiki ................... G06T 7/75 |
| | | | 382/103 |
| 2014/0313330 | A1 | 10/2014 | Carey |
| 2015/0341599 | A1 | 11/2015 | Carey |
| 2016/0127641 | A1 | 5/2016 | Gove |
| 2016/0283799 | A1 | 9/2016 | Carey |
| 2016/0351043 | A1 | 12/2016 | Tabe |
| 2017/0092089 | A1 | 3/2017 | Ye |

\* cited by examiner

MONITORING SYSTEM

BACKGROUND

A variety of security, monitoring and control systems equipped with cameras and additional sensors are used to detect various threats such as intrusions, fire, smoke, flood, and so on Motion detection is often used to detect intruders in vacated buildings. Detection of an intruder may lead to an audio or silent alarm and contact of security personnel. Video surveillance is also used to provide additional information about intruders into a vacated or occupied building.

Figure 1:
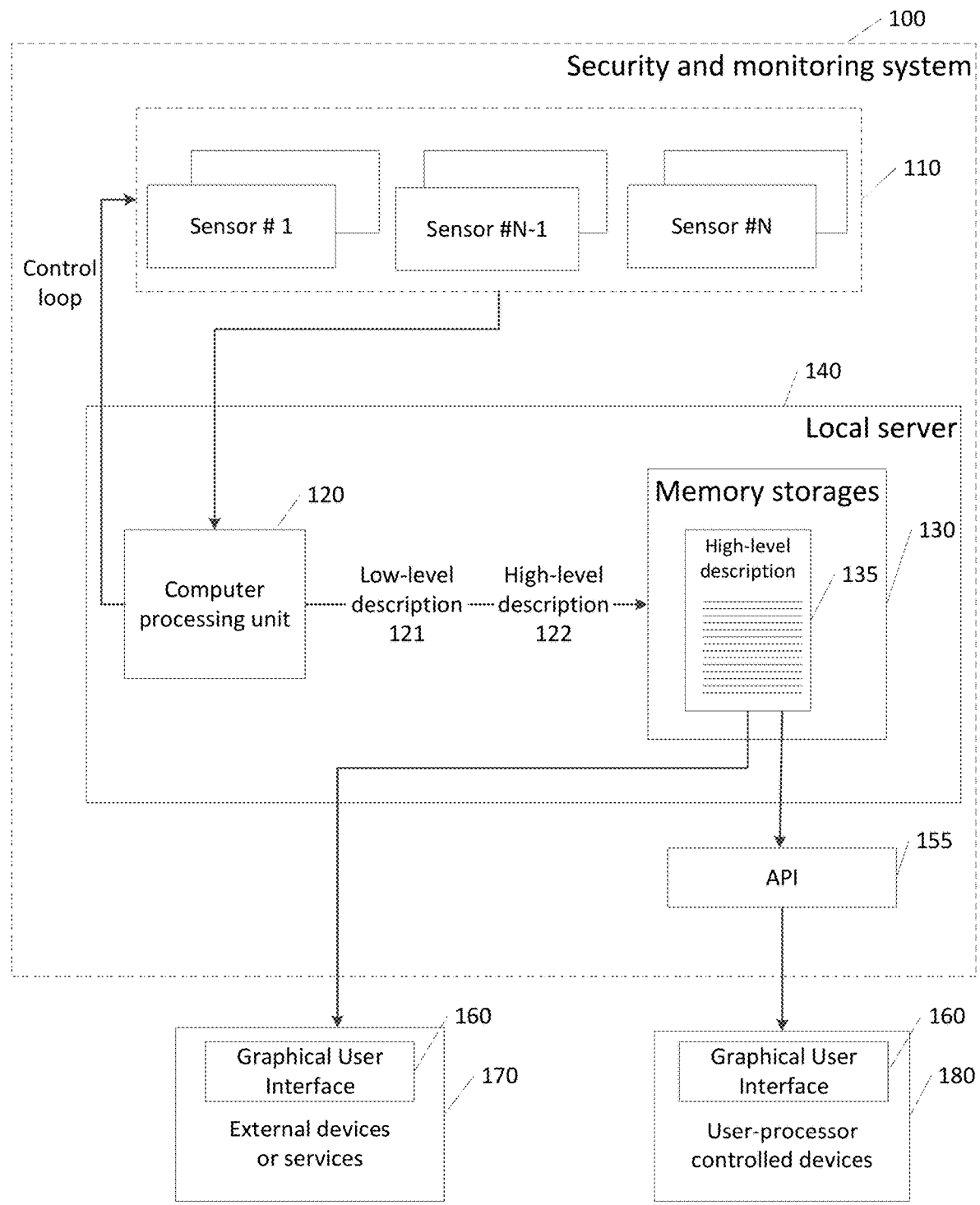
FIG. 1 illustrates a monitoring system according to an implementation.

The following detailed specification makes references to the accompanying drawings. The same symbols in the drawings refer to the same components, unless otherwise indicated. The sample aspects presented in the detailed specification, the drawings and the patent claims are not the only ones possible. The example aspects can be used or modified by other methods not described below, without abridging their scope or their essence. The different variants presented in the specification of the example aspects and illustrated by the drawings can be arranged, replaced and grouped in a broad selection of different configurations, which are examined in detail in the present specification.

DETAILED DESCRIPTION

Example aspects are described herein in the context of a monitoring system and a method for an object identification, an object's location detection, recognition of a type of an activity and time of the activity of the detected object. In particular, the system is able to collect data from a plurality of sensors, process the data and send alerts based on the processed data to prevent emergency situations.

For example, the described system may react automatically in situations such as an appearance of unknown person in the house during the night hours, an appearance of an unknown person in the master bedroom during the day hours, a broken window, a failure to shut off water in a bathroom, a baby crawling into a fireplace, a baby approaching a swimming pool with no adults in the vicinity, a person that has fallen down, a person is lying on a floor or in any other unusual location for a long time, a person crying for help, a child not returning from school at a normal time, and so on.

Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments. In the context of the present invention, the terms "a" and "an" mean "at least one".

The term "frame" herein may refer to a collection of video data, audio data and other available sensory data, captured from all the cameras and sensors of the monitoring system in one particular time moment, for example, in one second.

The term "object" herein may refer to an object observed by the monitoring system. The term "object" may refer to the animate object, for example, a person (in other words, an individual, a human), a pet, etc. Objects may be "known"-which means they are included into a system internal database of known people and pets, in other words which ID and characteristics are stored in the memory of the system, or "unknown"—object is not included into the database, or which characteristics are new for monitoring system.

The term "territory" herein may refer to territory to be observed by the monitoring system. For example, the term "territory" may refer to a living quarter, to an apartment, to a building of a hospital, a school, an old people's home, a private house, to an adjoining territory, etc.

The term "user" herein may refer to any person or group of people who may interact with the monitoring system. For example, a user may be an owner of a house, or a user may be a medical officer who takes care about the elderly person.

The term "zone" herein may refer at least to the part of the territory, for example, to a swimming pool, a fireplace, a room, etc.

The term "forbidden" zone herein may refer to a specific part of the territory to be observed by the monitoring system that is not allowed for a specific object.

The monitoring system may react by crossing of the object the border of the forbidden zone.

The term "allowed" zone herein may refer to a specific part of the territory observed by the monitoring system that is allowed for a specific object.

The term "abnormal event" herein may refer to pre-defined types of activities within a frame to which the monitoring system may react. For example, pre-defined types of activities may include motions related to the intrusions (such as breaking into a window, fighting, presenting weapons, etc.). Pre-defined types of activities also may relate to activities that may be typical for a specific medical condition (for example: falling down, agonizing, visible blood or injury, furniture movements, etc.) and so on.

The term "alarm condition" herein may refer to a set of rules, describing the situation that may be considered as dangerous and unsafe for normal wellbeing. In one embodiment, some of the rules may be predefined by the monitoring system. In another embodiment, the owner or other users may create and/or adjust rules. Defined set of rules depends on the scenarios or application of the monitoring system.

There is a plurality of scenarios how the monitoring system may be exploited. One of the illustrative examples is an equipping of a private house with the given monitoring system to protect people from a dangerous situation, to safeguard lives by detecting abnormal events and to send alert notifications to external services such as police or a user processor-controlled electronic devices. For example, the monitoring system may protect from physical break-ins, protect people from medical problems, react if a baby is approaching a swimming pool with no adults in the vicinity, and react when someone collapses or has a stroke.

Another illustrative example is equipping a hospital or elderly person home. The monitoring system monitors a person of interest in a room to react and call an alert or medical officer in case the monitored person has a stroke, loses consciousness, falls, faints and so on.

The monitored person may also provide an alarm signal to trigger an alarm notification. The term "alarm signal" herein may refer to a specific gesture, or a specific sound signal, which may turn the monitoring system into the alarm mode and initiates the procedure of sending the alarm notification to the external services or devices. The alarm signal is needed in the case when the monitoring system is not able to recognize the problem in automatic way, then the person may signal to about the problem.

FIG. 1 illustrates an exemplary monitoring system 100. Those of ordinary skills in the art will appreciate that hardware and software units depicted in FIG. 1 may vary without limitation of a scope of the disclosure.

In one embodiment, a monitoring system 100 includes a set of sensors 110 which may include at least video cameras, infrared lighting for night vision, and plurality of microphones. Moreover, the described monitoring system may have a gyroscope, a motion detector, a smoke sensor, a thermographic camera (heat detector), a detector of intrusion (through the window or doors), a thermometer, a smell detector and other sources of information. Sensors 110 may be allocated within the observed territory in such way that they capture signals including all information related to the activity within the territory. For example, sensors 110 of different types produce dense representation of signals and augment data received from other sensors to restore a complete frame. The list of detectors is illustrative.

Figure 2B:
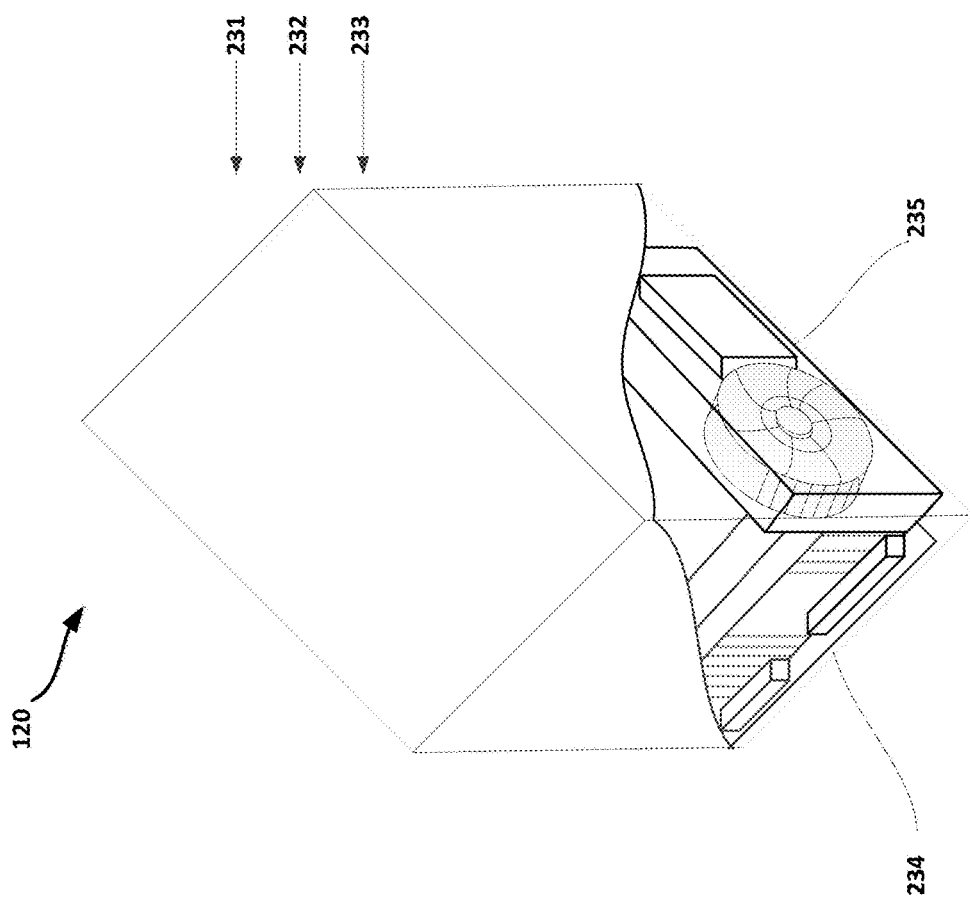
FIG. 2B illustrates an exemplary computer processing unit in according to an implementation.
Figure 2A:
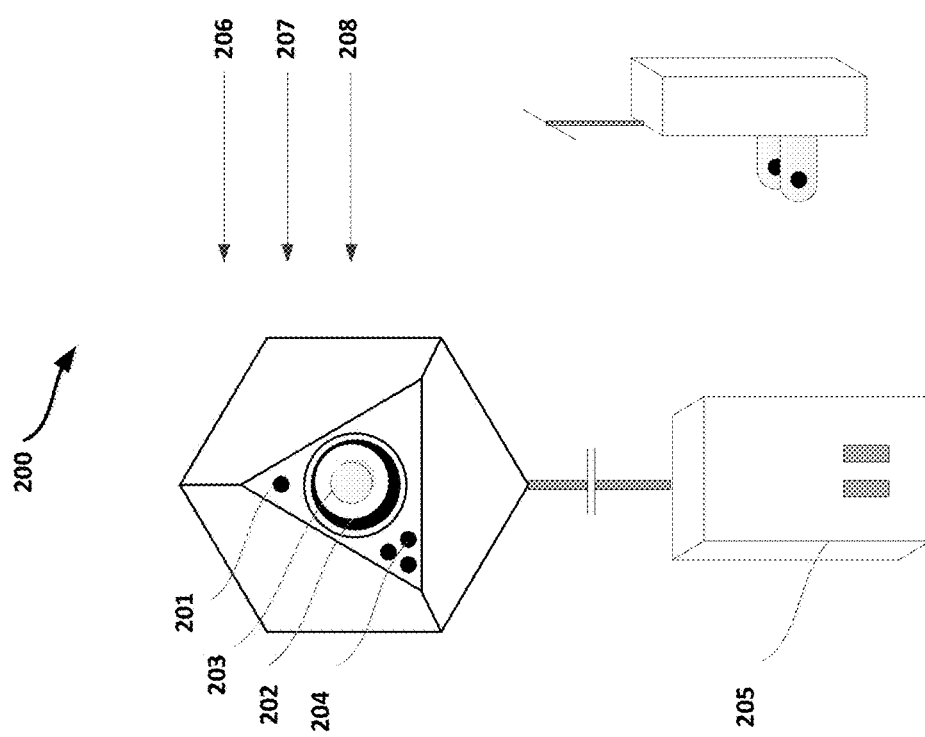
FIG. 2A illustrates an exemplary sensor in according to an implementation.

FIG. 2A illustrates an exemplary sensor, and in particular, an exemplary video camera 200 in according to an implementation. The video camera 200 includes, for example, a speaker 201, an infrared night light 202, a lens 203, a microphone 204, a pass-through adapter 205, a Wi-Fi unit 206, an ARM controller 207 and a backup battery 208.

Referring to FIG. 1, computer processing unit 120 interacts with a set of sensors 110 administrating them by a control loop. For example, computer processing unit 120 is a local processing system located within or proximate to a designated territory in which sensors 110 monitor activity. For example, computer processing unit 120 receives signals from sensors 110, and processes and analyzes the signals to produce messages that describe activity within the designated territory as monitored by sensors 110. The messages do not include audio, visual or other types of data that directly reveal the identity of persons within the designated territory. For example, the designated territory can an area in a school, a prison, hospital, a shopping mall, a street, an office, a parking lot or another type of area.

For example, computer processing unit 120 internally identifies bodies of people and animals within the designated territory based on one or a combination of video data using face metric identification that identifies and records facial features, clothes metric identification that detects and records types of clothes on a body, body metric identification that detects and records body shapes, activity metric identification that detects and records current activity of a body, hair-cut metric identification that detects and records hair-cut style tool metric identification that detects and records objects held or in near vicinity to a body, or another technique.

For example, computer processing unit 120 recognizes changes made to bodies within the designated territory and updates affected metric identifications. For example, computer processing unit 120 analyzes kinetic motion of identified bodies to insure movements consistent with laws of physics to detect and resolve inconsistencies when internally identifying bodies. For example, computer processing unit 120 additionally uses audio data to internally identify bodies of people and animals within the designated territory where the audio data includes timbre metrics and relative sound amplitudes.

FIG. 2B provides an example of the computer processing unit 120 in according to an implementation. The processing unit 120 may include, for example, a Wi-Fi router 231, a backup battery 232, a backup mobile internet module 233, a CPU board 234 and a GPU board 235.

In one embodiment, computer processing unit 120 may be included in a local server 140. The term "local" means that local server is allocated within the territory observed by monitoring system 100. Described allocation of the processing unit and a local server doesn't overload internet channel increasing the effectiveness of monitoring system 100. Privacy, data protection and data security are protected, for example, by data encryption. Additionally, privacy, data protection and data security are enhanced by the independence of monitoring system 100 from the Internet. Such independence from the Internet makes monitoring system 100 more confidential and reliable for users. Monitoring system 100 does not send any private source data to external storage resources such as a cloud storage system or some other external storage systems located outside the territory.

Signals from the set of sensors 110 are transferred to the central computer processing unit 120 where the signals are processed and analyzed. Computer processing unit 120 processes signals from sensors 110 to create low-level description of source incoming data. The low-level video description may include recognized objects—animate and inanimate—on different levels of hierarchy. For example, the low-level video description may include descriptions of a body, body parts, skeleton joint coordinates, body shape measurements and samples of clothes, skin colors and textures on different parts of the body. For example, the low-level video description may also include descriptions of a face, coordinates of facial features, a type of the haircut, external objects (such as earrings), and samples of color and texture on lips, ears, hairs, eyes and teeth. For example, the low-level video description may also include descriptions of hand, coordinates of finger joints, types of the finger and toe nails, samples of the color and texture of the fingers, the nails and the palms. A low-level audio description may include, for example, recognized sounds on different levels of hierarchy. For example, low-level audio description may include a single sound or morpheme, its spectrum, its relative amplitude on different microphones, or a longer duration audio sound which is recognized as known, such as, for example, a phrase to set an alarm on or off, or a phrase to enable/disable surveillance. Based on the low-level description 121 of data, high-level description 122 may be generated. The processed data received from the sensors 110 is stored in memory 130 in an accurate high-level description file 135, for example, in textual log-file. In one embodiment, the information in the high-level description file 135 may contain the following information: "1:53 pm 13 sec: Person ID="John", Person Location=(x,y); Person activity='reading'. For an example of activity detection used to create low-level description algorithms, see Serena Yeung, et al. "Learning of Action Detection from Frame Glimpses in Videos", arXiv:1511.06984, 2015. See also http://mscoco.org.

The high-level description 135 may be extracted from the memory storage and processed at any time. For example, the high-level description file 135 may be customized and transferred into the script of any other external system. For example, the information from the file 135 may be processed from text to speech.

Computer processing unit 120 uses the source signal (video signal, audio signal, data from smoke detector, etc.) from sensors 110 to recognize and differentiate objects within frame, and to identify type and spatial position of the detected objects. The result produced by computer processing unit 120 are stored in accurate high-level description file 135. Computer processing unit 120 may produce people and pet identification and re-identification units based on face metrics, body metrics, clothes metrics, hair-cut metrics, pose and limb coordinate estimations, detection of people and pets spatial position, detection of activity, detection of controlling visual gestures and audial signals, detections of specific medical conditions, detection of the "scenario" of people and pets interaction with the surrounding objects, and so on.

For example, spatial localization based on audio signal works uses relative amplitudes. That is, as an object moves towards and away from a microphone, the detected amplitude of an audio signal based on sound from the object varies based on location. The amplitude will vary dependent upon which microphone generates the audio signal based on the sound. When computer processing unit 120 receives audio signal samples pertaining to the spatial position of an object and the corresponding microphone signals amplitudes collected during a calibration stage and further updated during system operation, computer processing unit 120 can statistically correlate the distribution of the audio signal amplitudes at all the microphones on the territory with the known spatial locations of the object. The result of this statistical correlation is a mapping of the space of audial amplitudes to the plan of territory. So, when an object for a period is not seen by any of the video cameras, monitoring system 100 may restore the object spatial location by using the microphone signals and the mapping performed during the calibration stage.

Computer processing unit 120 interacts with a memory storage unit 130 to store the processed information, for example, in the form of high-level description 135 and to extract stored information for the further detailed analysis. Memory storage unit 130 may include, for example, a database of known persons 474, a short-term memory unit of the previous landmark positions 425, a short-term memory of faces, bodies and clothes metrics 435, a short-term memory of geometrical positions and personal identifications 485, a database of pre-set alert conditions 492, and a short-term memory of audio frames 850. To increase the reliability of monitoring system 100, the source unprocessed signals from the sensors may be stored in the memory just for a short period of time.

Monitoring system 100 may include an Application Programming Interface (API) module 155 that provides opportunity for interaction of a "user" with monitoring system 100. Applications on user-processor controlled electronic devices 180 by means of graphical user interface (GUI) 160 may access the server 140 through the Application Programming Interface (API) 155—a software interface. Interaction of a user with monitoring system 100 may be performed for example, through the mobile application or through the user interface of a desktop program 180. By means of graphical user interface of user-processor controlled electronic devices 180, a user may send the request to monitoring system 100 and monitoring system 100 may perform actions in accordance to the request and send a response to the user based on the results of data analysis received from sensors 110 and processed by the processing unit 120. One embodiment, for example may be represented by a client-server system or a request-response model.

Graphical User Interface (GUI) 160 on a user-processor controlled device 180 provides a user with the possibility to receive alerts from monitoring system 100, to view the collected, stored and analyzed data from sensors, to calibrate monitoring system 100, to define rules that describe the dangerous situation and to add new objects to the database of monitoring system 100.

In one embodiment, signals from the set of sensors 110 may be represented in a real time via display of user-controlled device (mobile phones, laptops, smartphones or personal computer, etc.) without any modifications. In other words, monitoring system 100 may provide to a user information pertaining to what is happening at a home. For example, GUI 160 of the system on the user-controlled device may display all captured video and images from all cameras and play the recorded audio tracks. The user may give a response to monitoring system 100 based on the viewed information by means of GUI 160. For example, the user may request monitoring system 100 to provide more detailed information from sensors 110, to give a report based on the analysis of data from sensors 110, to call an alert or to call off an alert, to call the police, ambulance or emergency service, or so on. In other words, monitoring system 100 gives access to the user to view information, to obtain access to stored data in memory storage 130 of server 140 and to control monitoring system 100.

In one embodiment, the user may be provided with the results of the information processed by unit 120 data. The high-level description 135 of one or several frames may be preprocessed to display the information on user-controlled device 180. The information may be represented in several ways, for instance in the form of textual report, in the form of a map, in the form of graphical reproduction or cartoons, or in the form of a voice that describes main events during the requested time period.

For example, the textual report may include textual information about the main events. For example, the textual report may say: "John woke up at 9 am, went to the kitchen, had a breakfast with nurse, spent 2 hours in the study room, spent one hour nearby the swimming pool."; "A nurse cooked breakfast at 8.30 am, cleaned the rooms, spent 2 hours with John in room B, . . . "; "Patient Mary G. took a medicine at 8 am, read book 3 hours, left a room at 1 pm, . . . "; and so on.

A user's desktop or mobile applications 160 in processor-controlled user devices 180 exchanges information with monitoring system 100. Electronic communications between computer systems generally includes packets of information, referred to as datagrams, transferred from processor-controlled user devices 180 to local server and from local server to processor-controlled user devices 180. The elements of the system exchange the information via Wi-Fi. Other possible channels of information transfer may also be used.

In comparison to other known electronic communications, the current interaction of a user/client with monitoring system 100 involves the adding and storing information within monitoring system 100 in such way that this information is stored in the memory storage of the local server 140 that is located inside the territory where monitoring system 100 is installed. This provides the privacy of information about the personal life of a user of the given system.

Monitoring system 100 is able to interact with external systems or services, for example, with smart house systems, with the police systems, with medical services, and so on. For example, the described system for monitoring, security and control 100 send alert notification to the external services and system 170, user processor-controlled devices 180 based on the analysis of the data from sensors 110. The alerts may be represented to user with help of GUI on the display for example. For example, external services and system 170 is a monitoring station that receives messages produced by computer processing unit 120 and makes the messages available to external observers.

For example, the messages describe actions performed by a person or animal with the designated territory sufficiently to allow an external observer to determine when external intervention is required. For example, external devices or services 170 includes a monitoring station that produces an alarm when the messages from computer processing unit 120 describe actions performed by a person or animal that indicate an external intervention may be required. For example, sensors 110 are selected to monitor children, disabled, sick or old persons. For example, the monitoring station forwards to computer processing unit 120 a query from an external observer and computer processing unit 120 responds with a message, wherein contents of the message are based on activity within the designated territory detected by processing and analyzing the signals from sensors 110.

Calibration is an initial step of running of monitoring system 100 within an unknown territory. During the calibration, monitoring system 100 identifies basic parameters of the territory, identifies the type of the territory, creates the map of the territory, and so on. For example, when the designated territory includes a plurality of rooms, the local processing system constructs a layout plan of the territory using video data from the sensors. For example, the local processing system additionally also uses audio data to construct the layout plan. For example, estimates of room geometry are based on detecting horizontal and vertical lines. For example, major objects within field of view of video sensors are detected and used to construct he layer. For example, neural network algorithms are used to recognize a room type form based a database of known room types. For example, measurements can be based on requested configuration activities of a user within a room.

Figure 3:
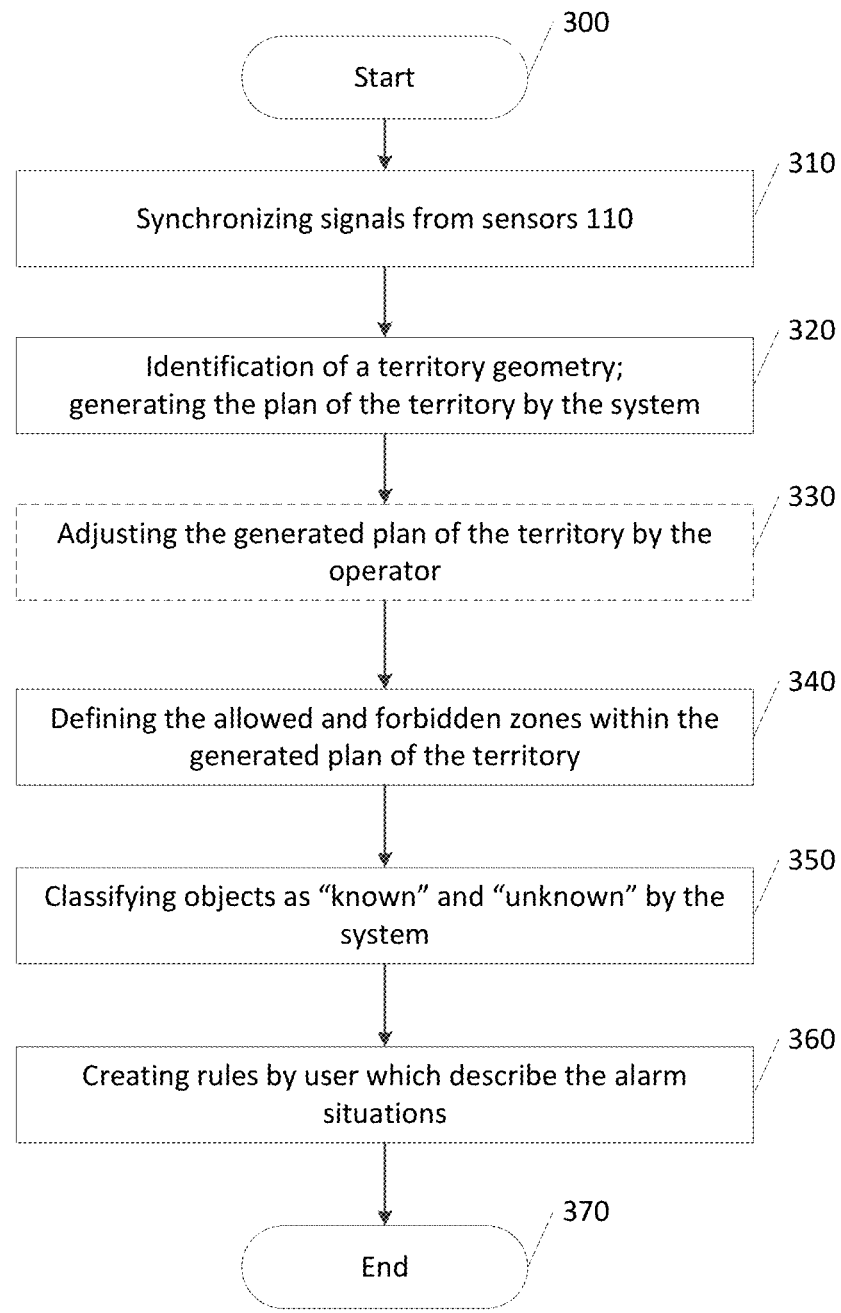
FIG. 3 illustrates an exemplary block diagram of the system calibration according to an implementation.

FIG. 3 illustrates an exemplary block diagram of a calibration method of monitoring system 100 in according to one or more aspects. The method of the calibration of monitoring system 100 starts at step 300 and proceeds to step 370.

At step 310, source signals from a set of sensors 110 are synchronized. One of the key characteristics of monitoring system 100 is the synchronization of all signals with the time. Time is a source of information which is used as additional coordinates for further analysis.

At step 320, monitoring system 100 determines the geometrical parameters of the territory. Particularly, monitoring system 100 may identify allocation of rooms inside the observed building, sizes of the rooms, their functions, the furniture inside the rooms, the parameters of adjoining territory, for example, garden, garage, playing ground etc. Monitoring system 100 may also determine an allocation of windows and entries, source of light, fireplaces, stairs, connection with other rooms, etc.

The type and function of territory may influence how monitoring system 100 100 will process the data from sensors, the type of abnormal event within the frame. For example, if the territory represents the private home, the scenarios will be different from the scenarios of monitoring system 100 in the hospital for elderly person. Type and function of the territory may be indicated by the user at step 330.

At step 320, monitoring system 100 may generate the plan of the territory based on the identified geometrical parameters. The estimation of the room geometry may be based on detecting horizontal and vertical lines, angle positions of the gyroscopes, detection of major objects within field of view of video sensors, and neural network algorithms to recognize a room type form based a database of known room types.

In one of the embodiments, a user may be requested during calibration to walk from one video camera to another, and from one microphone to another, allowing monitoring system 100 to create the plan of the territory based on the measurements as the user moves along a known trajectory. Monitoring system 100 also, for example, correlates the relative sound amplitudes of all the microphones with the spatial location of the object on a territory plan. A designed plan may include all available information about the territory, including, for example, the allocation of rooms, their geometrical sizes, windows, doors, stairs, source of light, the type of room, etc. In other words, the generated plan depicts the graphical image of the territory and is created to schematically represent to a user the received and processed data from the sensors of monitoring system 100.

Generating of a territory map may be performed in a semi-automatic way based on the data from the sensors 110. In one embodiment, monitoring system 100 creates the description of the preliminary plan and the user may correct the results of the created plan at step 330 to increase accuracy of identified parameters of the territory. Step 330 is optional and may be skipped. In one embodiment, monitoring system 100 creates the description of the living space in automatic way without operator assisting.

The plan of the territory may be conventionally divided into "forbidden" and "allowed" zones. In one embodiment, the "forbidden" and "allowed" zones may be common for all observed objects. In another embodiment "allowed" and "forbidden" zones may be specifically indicated for every specific object. For example, a child may have "forbidden zones", such as swimming pool, kitchen, stairs etc. A nurse and housemaid may have different "forbidden zones" such as, for example, a private study room or a bedroom.

At step 340, monitoring system 100 may automatically define forbidden zones for specific objects. For example, a fireplace and a pool may be defined as forbidden for a child. The operator may also indicate which zones are forbidden for which objects. For instance, user may tag on the plan "forbidden" and "allowed" zones for each of the observed object. These zones may be further changed or adjusted.

The purpose of dividing the space into "allowed" and "forbidden" zones is control and safety. In one embodiment, monitoring system 100 may react if an alarm condition is fulfilled, for example, when monitoring system 100 recognized that a child is approaching a forbidden zone, such as the swimming pool. Moreover, some user-defined rules may augment the procedure of verifying the "abnormal" event of a child approaching a swimming pool. For example, monitoring system 100 may check if there are some other objects (grownups) in the vicinity. Monitoring system 100 recognizes the "forbidden zones" and reacts to the approaching and crossing the borders of these zones. The technique of verifying the alarm condition will be described further in FIG. 4A, FIG. 4B, FIG. 8.

At step 350, all observed objects are classified by monitoring system 100 as being "known" and "unknown". All people and pets living on this territory, and also the important inanimate objects can be "introduced" to monitoring system 100 by the user, so it would add it to the database of "known" objects 474. The user gives them a name and gives access privileges to the "forbidden" and "allowed" zones.

At step 360, a user may create and augment some rules which may describe the alarm condition. Pre-defined rules represent some description of a situation that may be dangerous. In other words, rules may be described with help of a GUI of user processor-controlled devices that provide grammatical tools in form of main questions such as: "Who is doing something?"; "Where is she/he doing?"; "When is she/he doing?"; and "What is she/he doing?". Monitoring system 100 may already have some rules for alarm conditions. Also, user may add some types of activities that may be considered as abnormal event.

FIG. 4 provides an exemplary block diagram of a computer processing unit 120 operating in accordance with one or more aspects of the present disclosure to verify the alarm condition and send an alert notification to the external system or user processor-controlled devices.

At step 410, the computer processing unit 120 receives data of a video frame from at least one sensor, for example, from a camera viewfinder 200. The frame is being analyzed based on the known image processing technique.

At step 420, detection and localizing of anatomical landmarks of a human body on the frame is performed. Anatomical landmarks of a human body may include, for example, a forehead, a chin, a right shoulder, a left shoulder, a right palm, a left palm, a right elbow, a right elbow, a right hip, a left hip, a right knee, a left knee, a right foot, a left foot, and so on This list is illustrative, as other parts of a human body may be detected. A hierarchy of body parts exist and may be used for verification of a correct detection of an object.

Figure 5:
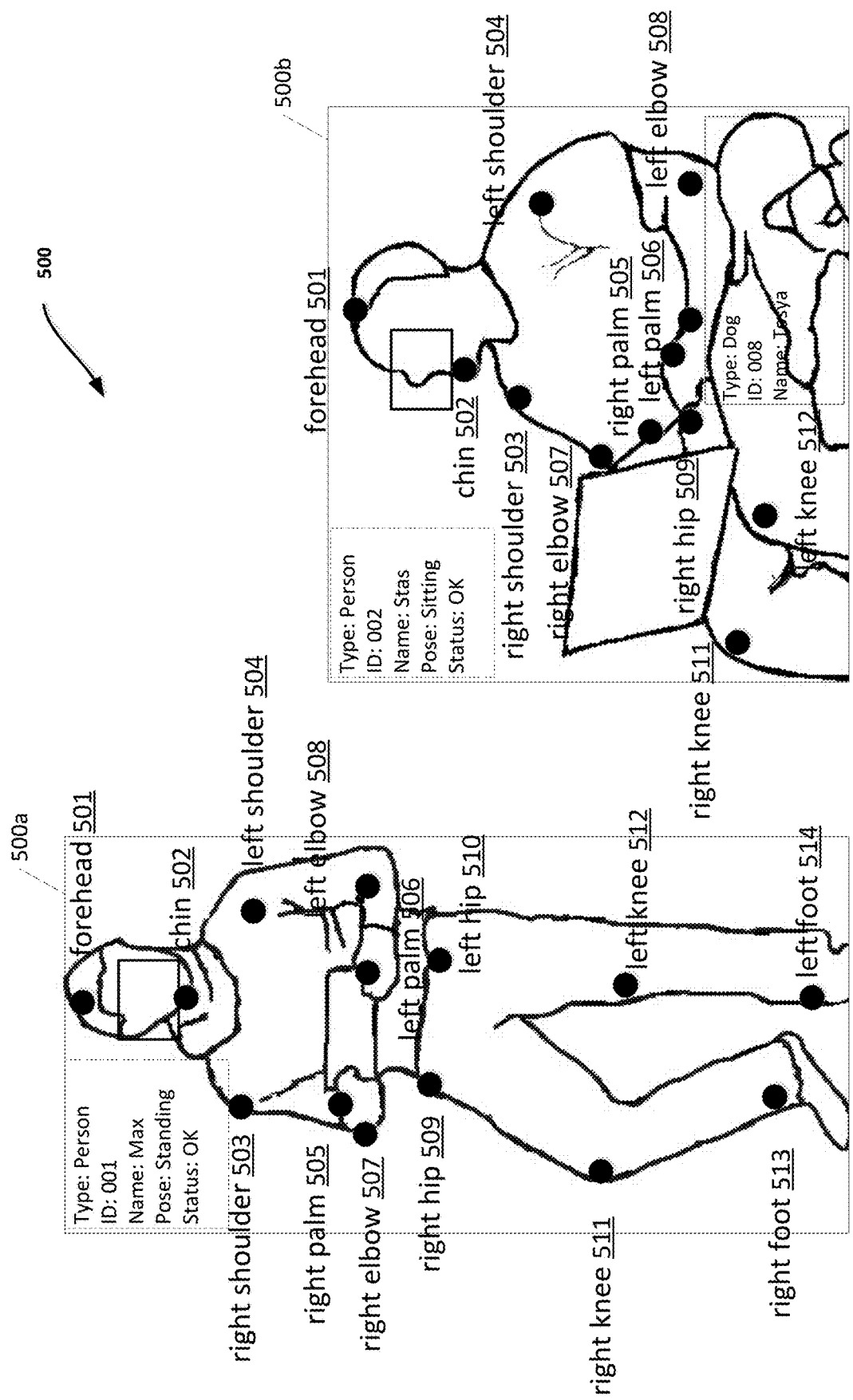
FIG. 5 illustrates an exemplary screen of a user processor-controlled electronic device that contains a frame with identified objects in a viewfinder in according to an implementation.

FIG. 5 illustrates schematically an exemplary screen of user processor-controlled electronic device that contains a frame with identified objects in a viewfinder, n according to an implementation. Anatomical landmarks such as a forehead 501, a chin 502, a right shoulder 503, a left shoulder 504, a right palm 505, a left palm 506, a right elbow 507, a left elbow 508, a right hip 509, a left hip 510, a right knee 511, a left knee 512, a right foot 513, a left foot 514, etc. of human bodies are identified within the frame 500. At step 420, monitoring system 100 may interact with a short-term memory storage 425 to extract data about previous landmark positions. The term "previous" may refer to the information extracted from the previously analyzed frames.

The identified anatomical landmarks are the basis points to generate a human skeleton and to detect the pose and activity of a human. The human body is identified based on deep learning algorithm of an object recognition. For example, the approach "Real-time Multi-Person 2D Pose Estimation using Part Affinity Fields" of Zhe Cao, Tomas Simon, Shih-En Wei Yaser Sheikh, arXiv:1611.08050, 2016, may be used. Other algorithms of machine learning such as "Long short-term memory" (recurrent neural network) may be used here.

Figure 6:
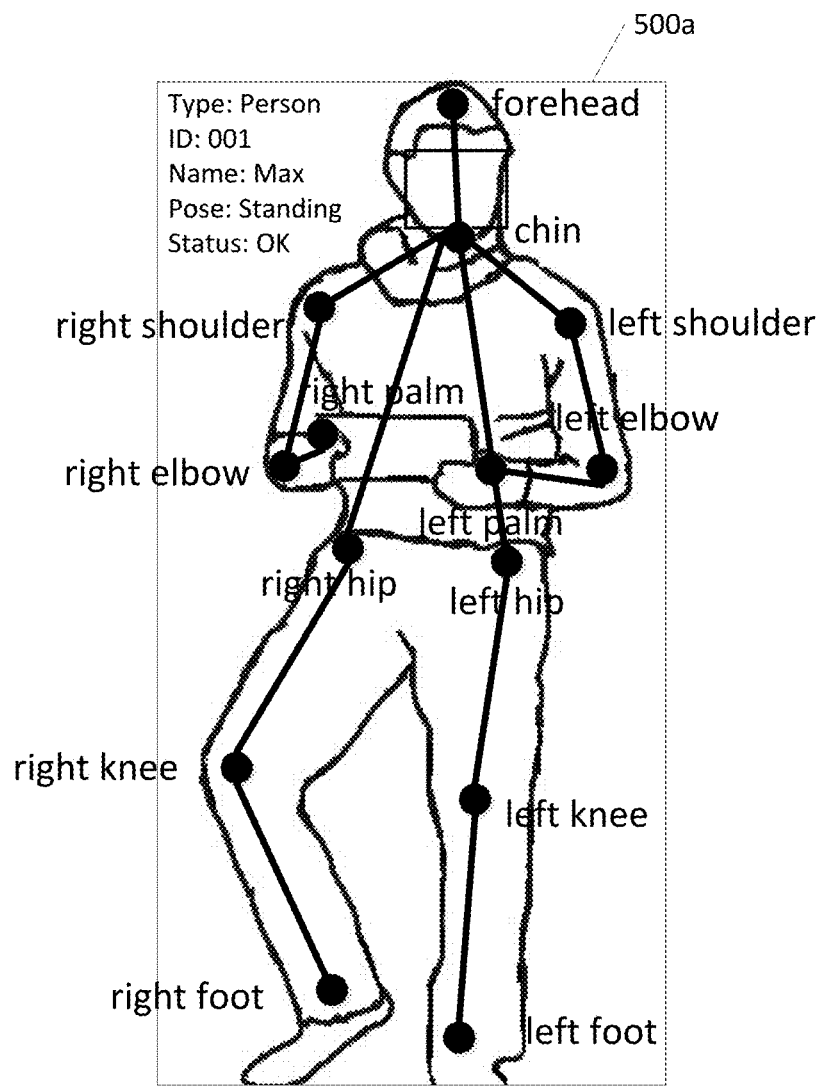
FIG. 6 illustrates an exemplary screen of user processor-controlled electronic device that contains a frame with identified object in a viewfinder in according to an implementation.

Referring to FIG. 5, two persons 500a and 500b and a pet are identified within the frame. Each person is included in a describing rectangle that is designed based on the anatomical landmarks of the human body. FIG. 6 illustrates an example user interface of monitoring system 100 in according to an implementation. Namely FIG. 6 illustrates the exemplary results of human skeleton restoring, individual identification, pose detection on a larger scale.

A person can be reliably identified by his/her face or audial timbre. However most of the time the face is not visible to the video cameras. In one of the embodiments one of the video cameras is directed toward the entrance to the territory, so at least it captures a face of everybody who enters. One a person is identified by his/her face or audial timbre, all other metrics of this person are measured and updated: his/her today clothes, hairstyle, attached objects such as earrings, rings, bracelets, samples of her lips color, body shape measurements.

Some of such metrics are built into monitoring system 100. However, in one of the embodiments, monitoring system 100 can add new metrics to itself, as it challenges itself and learns automatically over time to recognize better and better "known" people on this territory using even minor clues. For example, after a certain amount of time monitoring system 100 will recognize a person by only a fragment his/her hand, for example.

Some metrics are known to be constant over long time including, for example, facial features, audial timbre or body shape measurements. The other metrics, such as clothes, are only valid for a short time, as a person can change clothes. However, such "short-time" metrics are extremely robust for short-term tracking. Clothes are often more visible to a camera than a face. Some other metrics can have "medium duration", for example, a hair-style.

Figure 4A:
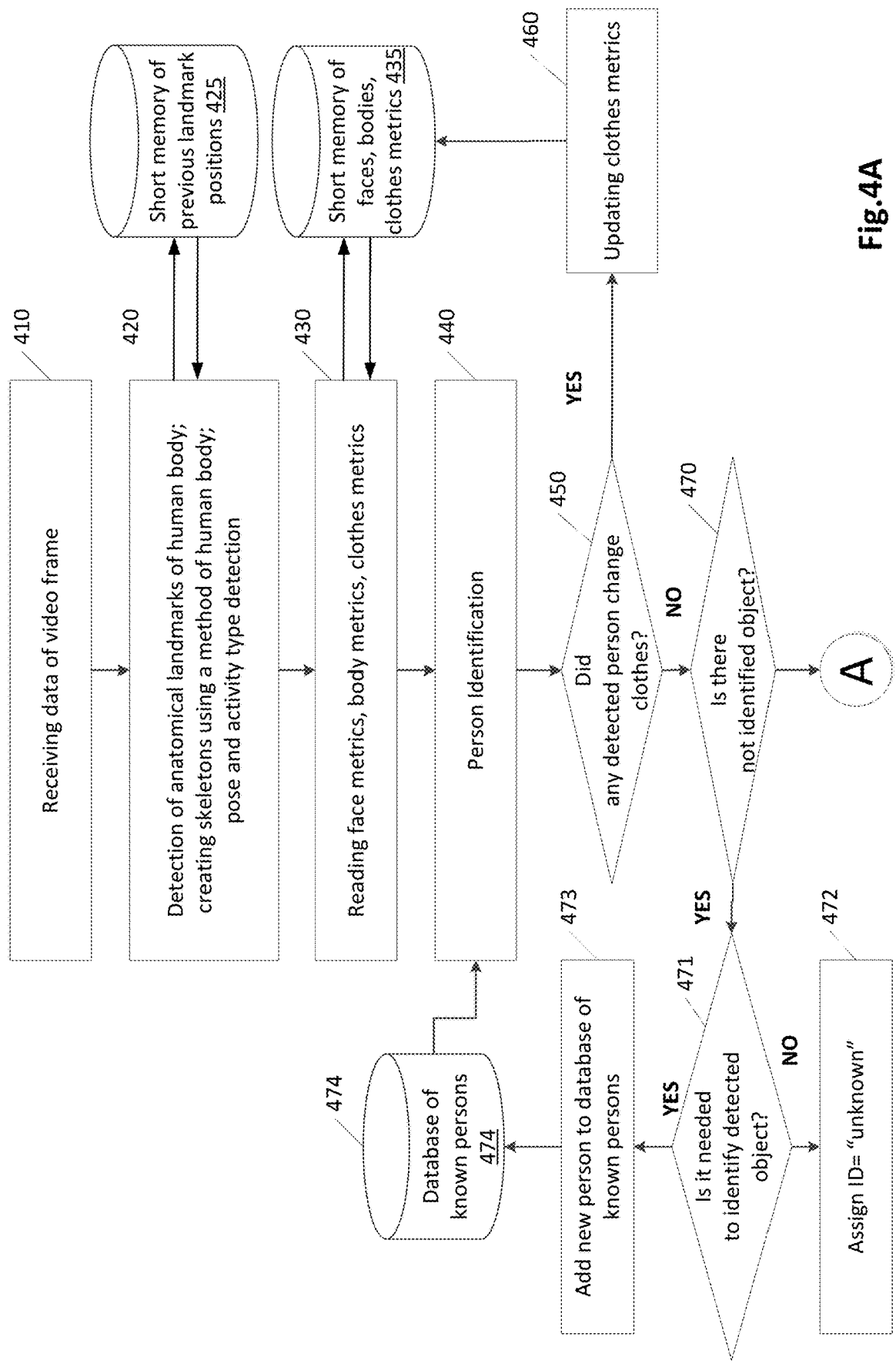
FIG. 4A illustrates an exemplary block diagram of monitoring and alarm condition detection according to an implementation.

Referring to FIG. 4A, monitoring system 100 recognizes a detected person as "known" or "unknown". The person may be identified precisely and identification of the person is assigned. FIG. 5 also depicts the main information about the identified object, For example, the type of the object (person or pet), identification, name, pose (standing, sitting) and status.

Referring to FIG. 4A at step 430, reading of face metrics, body metrics, and clothes metrics is performed. Monitoring system 100 recognizes the biometric parameters of humans within the frame of video stream. Monitoring system 100 may use the identification based on the shape of the body of a human, haircut or clothes. This type of identification is not reliable but may be used at one of the level of identification.

Behavioral characteristics are related to the pattern of behavior of a person, including but not limited to typing rhythm, gait, and voice. In one embodiment, the person may be identified based on the timbre of voice. The voice may be not recorded because of the privacy. Monitoring system 100 tracks the sound intensity and the spectral characteristics of the sound. Behavioral characteristics are stored in the memory of monitoring system 100 and analyzed. Monitoring system 100 may know what behavior, type and time of activities is typical for a specific object. At step 430, monitoring system 100 may interact with a short-term memory storage 435 faces, bodies, clothes metrics which contain the information about detected faces, bodies, clothes metrics detected at the previous frame.

At step 440, person identification is performed based on the assembled from previous steps and extracted information from database of known person 474.

Moreover, monitoring system 100 allows for identification of a "known" person who just changed clothes. At step 450, monitoring system 100 verifies whether any detected person has changed clothes. If somebody has changed clothes, monitoring system 100 goes to step 460 to update the clothes metrics data and to add it to the short-term memory of faces, bodies, clothes metrics 435.

If nobody within the frame has changed clothes, monitoring system 100 checks at step 470 whether all persons are identified. If there are not identified objects, monitoring system 100 checks 471 whether it is needed to uniquely identify the person or not. For example, monitoring system 100 may send a request to user to add 473 a new "unknown" person to the database of "known" persons 474. The use may approve the request and give information (name, age, etc.) about detected objects which may be further used in person identification procedure. If it is not necessary to identify the person, monitoring system 100 assigns ID="unknown" at step 472. In case of an emergency situation (alarm condition), the biometrical date of this unknown person is transferred to the external services, for example, to the policy.

Figure 4B:
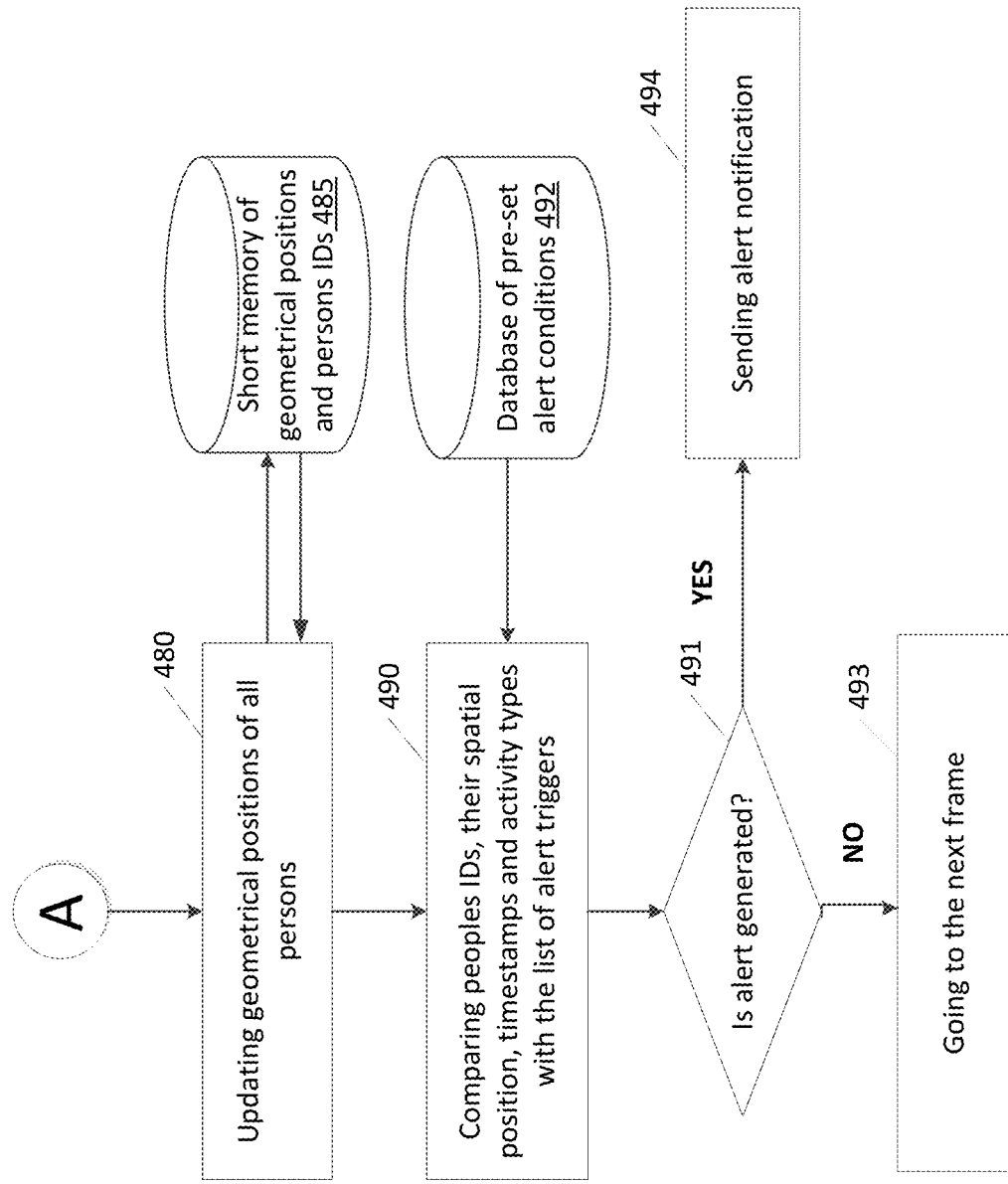
FIG. 4B illustrates an exemplary block diagram of monitoring and alarm condition detection according to an implementation.

FIG. 4B illustrates the continuation of the FIG. 4A. At step 480 monitoring system 100 updates the geometrical (spatial) positions of all objects based in the information from the short-term memory of geometrical positions and personal IDs 485.

At step 490 monitoring system 100 compares people's IDs, their spatial position, timestamps and activity types with the list of alert triggers. Database of pre-set alert conditions 492 may be used here. Database of pre-set alert/alarm conditions 492 may include description of specific objects, such a blood or weapons. If alert is generated at step 491, monitoring system 100 may send alert notification 494 to the external system or devices and user-controlled devices.

If an alert is not generated at step 491, monitoring system 100 continues 493 to process data from the next frame. Techniques for improvements of identification may be used to increase the accuracy of monitoring system 100. For example, such techniques may be used to track a person sitting or staying with their back to the camera, moving from one room to another room, changing clothes or hidden behind furniture. Techniques for tracking a person may be augmented using audio data from microphones. Techniques for tracking a person augmented when an identified object disappears from one camera viewfinder and does not appear in another camera viewfinder and system are important to prevent losing track of such an identified object. When the location of a person is known, it is correlated with the signal from microphones. Then monitoring system 100 may restore the coordinated of a person based only on the signals from the microphones.

The proposed monitoring system 100 is able to identify animal, for example, cats, dogs, etc. Identification of pets is needed for further video frame decomposition and analysis. For example, monitoring system 100 does not react to the motion of pets, when the house is temporally left by the owners. On other hand when a pet bites bite a child, monitoring system 100 reacts and call an alert or makes contacts with a designated adult in closest vicinity to the child. Such a rule describing this dangerous situation may be added by user into monitoring system 100.

Figure 7:
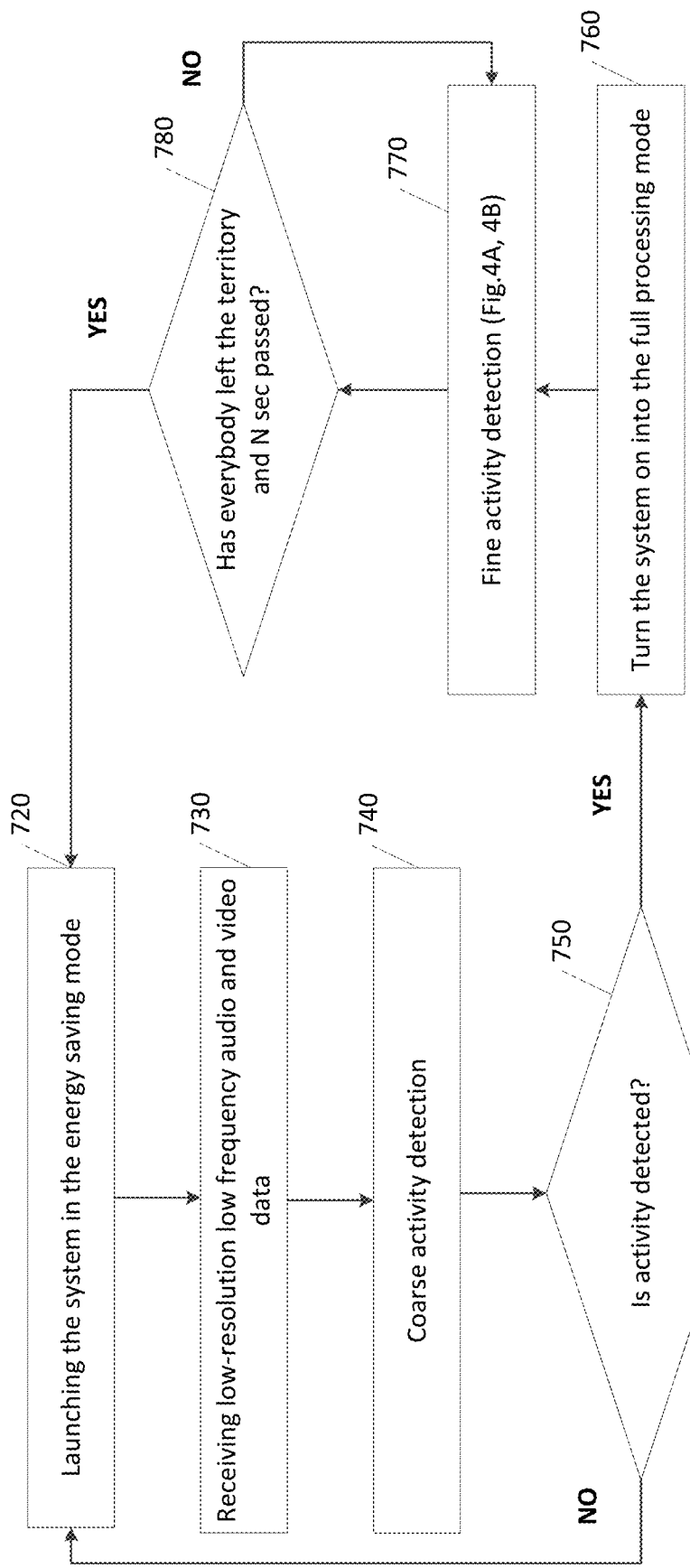
FIG. 7 illustrates an exemplary block diagram of a system operation in different modes in according to an implementation.

The described monitoring system 100 is adaptive. It means that monitoring system 100 may work in different modes to save energy and resources. FIG. 7 illustrates an exemplary block diagram of the running monitoring system 100 in several modes according to an implementation. At step 720, monitoring system 100 is launched. Most of the time monitoring system 100 works in an energy saving mode. At step 730, monitoring system 100 receives signals from sensors 100, namely low-resolution low frequency audio and video data. At step 740, monitoring system 100 detects only a few categories of the objects and their coarse activity. If activity is not detected in step 750 within the frame, monitoring system 100 returns to the step 720.

If activity is detected in step, 750 monitoring system 100 turns on into a full processing mode 760 to detect in step 770 the type of activity precisely as was described above in according to FIG. 4A,4B. Monitoring system 100 may verify some conditions as in step 780, for example, whether every object has left the territory and N seconds passed. If these conditions are not fulfilled monitoring system 100 returns to step 720.

Figure 8:
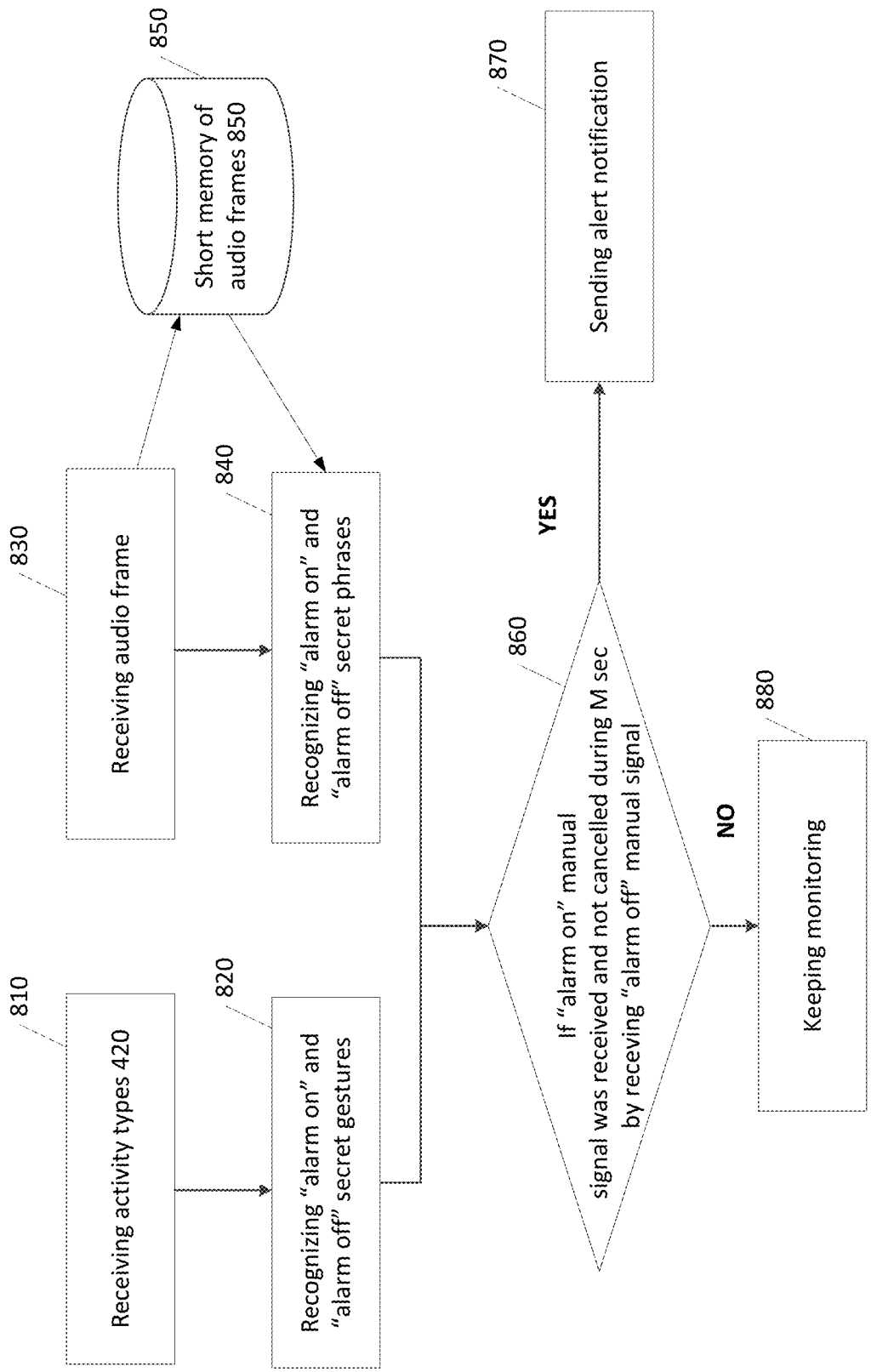
FIG. 8 illustrates an exemplary block diagram of a system operation in case of a secret signal detection in according to an implementation.

The described monitoring system 100 is able to recognize preliminary defined alarm signals, such as for example, a gesture, a spoken phrase, or an audio signal to increase the accuracy in preventing of dangerous events. The alarm signal is needed in the case when monitoring system 100 is not able to recognize the problem automatically, requiring a person to signal to about the problem. FIG. 8 illustrates an exemplary block diagram to detect the alarm signal and send alarm notification to external services or user processor-controlled devices in according to an implementation.

At step 810, monitoring system 100 receives description of types of activity detected earlier. The flowchart in FIG. 4B provides more detail. At step 820, recognition of "alarm on" and "alarm off" secret gestures is performed. For example, secret gestures are included in monitoring system 100 during the calibration stage of monitoring system 100. Secret gestures are purposed to notify monitoring system 100 about an abnormal event. Secret gestures may trigger the alarm notification sending ("alarm on" secret gestures) or stop monitoring system 100 ("alarm off" secret gestures) from performing an action based on a false triggering. In one of the embodiments, monitoring system 100 may have a pre-set list of pre-trained visual and audial alarm on/off gestures or phrases, such as known to be particularly easy for recognition by monitoring system 100. The user then would choose one or few from this list.

Moreover, monitoring system 100 is able to recognize secret audio signals. So, at step 830 monitoring system 100 may receive audio frames. At step 840, recognition of "alarm on" and "alarm off" secret phrases is performed. For example, short memory 850 of audio frames is used for this purpose.

At step 860, it is verified whether an "alarm on" manual signal was received and not cancelled during M sec by receiving "alarm off" manual signal. If these conditions are not fulfilled, in step 880 monitoring system 100 continues monitoring by going to the next frame and keeping tracking of detected objects. If these conditions are fulfilled monitoring system 100 send alert notification at step 870.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention.

What is claimed is:

1. A monitoring system comprising:
   one or more sensors that monitor activity within a designated territory, the sensors including visual sensors that make video recordings;
   a local processing system receiving signals from the sensors, the local processing system being calibrated to define allowed and forbidden zones within the designated territory, to classify objects within the designated territory as known or unknown and to recognize one or more activities or metrics of a person, the local processing system processing and analyzing the signals from the sensors and applying one or more rules to allowed and forbidden zones of information, known or unknown object information, activity information or a combination thereof to identify abnormal events and/or the person associated with the abnormal events and to produce one or more messages that describe the abnormal events within the designated territory as monitored by the sensors; and
   a monitoring station outside the designated territory, the monitoring station receiving the messages produced by the local processing system and making the messages available to external observers;
   wherein the monitoring system is configured to learn automatically over time from the information monitored to include new metrics of the person into consideration and to identify the abnormal events and/or the person associated with the abnormal events within the designated territory by recognizing a fraction of information of the metrics of the person.

2. The monitoring system as in claim 1, wherein the monitoring station produces an alarm when the messages describe actions performed by a person or animal that indicate an external intervention may be required.

3. The monitoring system as in claim 1 wherein the sensors are selected to monitor children, disabled, sick or old persons.

4. The monitoring system as in claim 1 wherein when the monitoring station forwards to the local processing system a query from an external observer, the local processor responds with a message, wherein contents of the message are based on activity within the designated territory detected by processing and analyzing the signals from the sensors.

5. The monitoring system as in claim 1, wherein the monitoring station produces an alert when the messages indicate a predetermined gesture or predetermined phrase is detected by the sensors.

6. The monitoring system as in claim 5, wherein the monitoring station cancels the alert when the messages indicate a predetermined cancelation gesture or predetermined cancelation phrase is detected by the sensors.

7. The monitoring system as in claim 1, wherein the local processing system internally identifies bodies of people and animals within the designated territory based on video data using at least one of the following techniques:
   face metric identification that identifies and records facial features;
   clothes metric identification that detects and records types of clothes on a body;
   body metric identification that detects and records body shapes;
   activity metric identification that detects and records current activity of a body;
   hair-cut metric identification that detects and records hair-cut style;
   tool metric identification that detects and records objects held or in near vicinity to a body.

8. The monitoring system as in claim 7, wherein the local processing system recognizes changes made to bodies within the designated territory and updates affected metric identifications.

9. The monitoring system as in claim 1, wherein the local processing system additionally uses audio data to internally identify bodies of people and animals within the designated territory, the audio data including timbre metrics and relative sound amplitudes.

10. The monitoring system as in claim 1, wherein the local processing system internally identifies bodies of people and animals within the designated territory based on video data using more than one of the following techniques:
    face metric identification that identifies and records facial features;
    clothes metric identification that detects and records types of clothes on a body;
    body metric identification that detects and records body shapes;
    activity metric identification that detects and records current activity of a body;
    hair-cut metric identification that detects and records hair-cut style;
    tool metric identification that detects and records objects held or in near vicinity to a body.

11. The monitoring system as in claim 1, wherein the designated territory includes an area in at least one of the following:
    a school,
    a prison,
    a hospital,
    a shopping mall,
    a street,
    an office,
    a parking lot.

12. The monitoring system as in claim 1, wherein the designated territory comprises a plurality of rooms, the local processing system constructing a layout plan of the territory using video data from the sensors.

13. The monitoring system as in claim 12, wherein the local processing system additionally uses audio data to construct the layout plan.

14. The monitoring system as in claim 12, wherein when constructing the layout plan of the territory, the local processing system utilizes at least one of the following:
    estimates of room geometry based on detecting horizontal and vertical lines; detection of major objects within field of view of video sensors;
    neural network algorithms to recognize a room type form based a database of known room types;

measurements based on requested configuration activities of a user within a room; configuration audio signals detected by audio sensors.

15. A method for monitoring activity within a designated territory, comprising:
  using one or more sensors to make video recordings;
  forwarding signals from the sensors to a local processing system located within or proximate to the designated territory,
  calibrating the local processing system to define allowed and forbidden zones within the designated territory, to classify objects within the designated territory as known or unknown and to recognize one or more activities or metrics of a person,
  using the local processing system to process and analyze the signals from the sensors and to apply one or more rules to allowed and forbidden zones information, known or unknown object information, activity information or a combination thereof to identify abnormal events and/or the person associated with the abnormal events and to produce one or more messages that describe the abnormal events within the designated territory as monitored by the sensors;
  sending the messages to a monitoring station outside the designated territory, the monitoring station making the messages available to external observers;
  learning automatically over time from the information monitored to include new metrics of the person into consideration and to identify the abnormal events and/or the person associated with the abnormal events within the designated territory by recognizing a fraction of information of the metrics of the person.

16. The method as in claim 15, additionally comprising: produces an alert by the monitoring station when the messages indicate a predetermined gesture or predetermined phrase is detected by the sensors.

17. The method as in claim 15, additionally comprising: internally identifying bodies of people and animals within the designated territory based on video data using one or more of the following techniques:
  face metric identification that identifies and records facial features,
  clothes metric identification that detects and records types of clothes on a body, body metric identification that detects and records body shapes, activity metric identification that detects and records current activity of a body,
  hair-cut metric identification that detects and records hair-cut style, and
  tool metric identification that detects and records objects held or in near vicinity to a body.

18. The method as in claim 15, additionally comprising: recording audio data by the sensors, the audio data being used to internally identify bodies of people and animals within the designated territory, the audio data including timbre metrics and relative sound amplitudes.

19. The monitoring system according to claim 1 wherein the object is a person or animal, and the local processing system converts the received signals from the sensors related to the person or animal into skeleton joint coordinates before the step of applying the rules to allowed and forbidden zones of information, known or unknown object information, activity information or a combination thereof.

20. The method as in claim 15 wherein the object is a person or animal, and the local processing system converts the received signals from the sensors related to the person or animal into skeleton joint coordinates before the step of applying the rules to allowed and forbidden zones of information, known or unknown object information, activity information or a combination thereof.

21. The monitoring system according to claim 1 wherein the abnormal events and/or the person associated with the abnormal events is identified based on a pattern of behavior of the person monitored over time.

22. The monitoring system according to claim 1 wherein the monitoring system is independent from the Internet and does not send any private data of the person to any external storage resource located outside the designated territory.

23. The monitoring system according to claim 1 wherein the monitoring system is configured to add and store information within the monitoring system in such way that this information is stored in the storage of the local processing system located inside the designated territory where monitoring system is installed.

24. The monitoring system according to claim 1 wherein the monitoring system is configured to decompose and analyze images extracted from the video recordings to identify the abnormal events and/or the person associated with the abnormal events.

25. The method as in claim 15 further comprising identifying the abnormal events and/or the person associated with the abnormal events based on a pattern of behavior of the person monitored over time.

26. The method as in claim 15 further comprising sending no private data of the person to any external storage resource located outside the designated territory.

27. The method as in claim 15 further comprising adding and storing information in such way that this information is stored in the storage of the local processing system located inside the designated territory where local processing system is installed.

28. The method as in claim 15 further comprising decomposing and analyzing images extracted from the video recordings to identify the abnormal events and/or the person associated with the abnormal events.

* * * * *